(12) United States Patent
Blair (10) Patent No.: US 10,419,613 B2
(45) Date of Patent: *Sep. 17, 2019

(54) COMMUNICATION SESSION ASSESSMENT

(71) Applicant: VERINT AMERICAS INC., Alpharetta, GA (US)

(72) Inventor: Christopher Douglas Blair, East Sussex (GB)

(73) Assignee: VERINT AMERICAS INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,834

(22) Filed: Dec. 11, 2018

(65) Prior Publication Data
US 2019/0124201 A1   Apr. 25, 2019

Related U.S. Application Data

(63) Continuation of application No. 14/557,092, filed on Dec. 1, 2014, now Pat. No. 1,018,525, which is a continuation of application No. 11/621,134, filed on Jan. 9, 2007, now Pat. No. 8,903,078.

(51) Int. Cl.
| | |
|---|---|
| *H04M 3/51* | (2006.01) |
| *G06Q 10/06* | (2012.01) |
| *G06Q 10/10* | (2012.01) |
| *H04M 3/42* | (2006.01) |

(52) U.S. Cl.
CPC .... *H04M 3/5175* (2013.01); *G06Q 10/06398* (2013.01); *G06Q 10/10* (2013.01); *H04M 3/42221* (2013.01)

(58) Field of Classification Search
None
See application file for complete search history.

(56) References Cited

U.S. PATENT DOCUMENTS

| | | | |
|---|---|---|---|
| 6,724,887 B1 * | 4/2004 | Eilbacher | H04M 3/5183 379/265.02 |
| 8,903,078 B2 * | 12/2014 | Blair | G06Q 10/10 379/265.06 |
| 10,187,525 B2 * | 1/2019 | Blair | H04M 3/5175 |

(Continued)

*Primary Examiner* — Antim G Shah
(74) *Attorney, Agent, or Firm* — Meunier Carlin & Curfman LLC (57) ABSTRACT

A communication session analyzer is integrated or otherwise coupled to an audio player to generate a system for analyzing voice-based communication sessions. Embodiments of the system also include a data store and an output device, respectively. The analyzer identifies a communication session attribute. An automated or human reviewer of a stored communication session forwards an assessment for an observed communication session. The data store receives and stores the communication session attribute with the assessment in a common format. Alternatively, an output device generates a representation that includes the communication session attribute and the assessment. When customer feedback is available for a particular communication session, the system identifies the communication session as one that should be reviewed. Once an internal reviewer indicates that the review/assessment is complete, the system presents communication session attributes together with the session assessments from both the internal reviewer and the customer.

20 Claims, 9 Drawing Sheets

(56) References Cited

U.S. PATENT DOCUMENTS

2003/0009373 A1\* 1/2003 Ensing .............. G06Q 10/0637
705/7.33
2003/0033145 A1\* 2/2003 Petrushin ................ G10L 17/26
704/236
2006/0265090 A1\* 11/2006 Conway ............ H04M 3/42221
700/94

\* cited by examiner

COMMUNICATION SESSION ASSESSMENT

CROSS-REFERENCE TO RELATED APPLICATIONS

This application is a continuation of U.S. patent application Ser. No. 14/557,092, filed Dec. 1, 2014, entitled "Communication Session Assessment," which is a continuation of U.S. patent application Ser. No. 11/621,134, filed Jan. 9, 2007, entitled "Communication Session Assessment," now U.S. Pat. No. 8,903,078, which are incorporated herein by reference in their entirety.

BACKGROUND

It is desirable in many situations to record voice communications, such as telephone calls. This is particularly so in a contact center environment in which many agents may be handling hundreds of telephone calls each day. Recording of these telephone calls can allow for quality assessment of agents, improvement of agent skills, dispute resolution, and can provide additional benefits.

Recording systems that record telephone calls and allow users of the systems to search for specified calls based on one or more call attributes are well known. Generally, recordings matching a set of criteria are displayed or otherwise presented to a user to review details of the calls and as a guide in selecting calls to replay to review and assess.

In existing systems, call attributes or information about the call are stored in a first data store that enables a reviewer or an automated system, using one or more call attributes, to search for select calls for subsequent evaluation. Thus, call attributes are inputs to these call evaluation systems. The reviewer evaluates the select calls and generates one or more scores or comments regarding the content of each call. The scores or comments are typically stored separately from the call attributes. The scores or comments (i.e., outputs of the call evaluation) are then used to generate one or more reports regarding each evaluated call or a set of evaluated calls. Thus, existing systems treat call attributes differently than call scores. As a result, it is difficult to identify, retrieve and integrate call attributes and call scores.

Thus, a heretofore unaddressed need exists in the industry to address the aforementioned deficiencies and inadequacies.

SUMMARY

A communication session analyzer is integrated or otherwise coupled to an audio player to create a system for analyzing voice-based communication sessions. The analyzer identifies one or more communication session attributes. An automated or human reviewer of the stored communication session generates and forwards at least one assessment for an observed communication session. A data store receives and stores the communication session attributes with the at least one assessment in a common format. Stated another way, the system forwards reviewer assessments of communication sessions to be stored with communication session attributes. The common format can be a single database or metadata file or in some cases may include the integration of an assessment and an attribute in the same data abstraction (e.g., a single table in a relational database or a class in an object-oriented database).

Advantageously, when customer feedback is available for a particular communication session, the system preferentially identifies the communication session as one that should be internally reviewed. The system presents the one or more communication session attributes to the internal reviewer but refrains from presenting the customer assessment until the internal reviewer indicates that the internal review of the communication session is complete. Once the internal reviewer indicates that the internal review/assessment is complete, the system presents the communication session attributes together with the communication session assessments (both internal and customer generated). As a result, the internal reviewer's assessment of the communication session can be confirmed when it correlates with the customer's assessment of the session, or the internal reviewer can use the customer's assessment of the communication session to modify future internal assessments.

In one embodiment, an agent that is a party to a particular communication session is encouraged to enter an assessment of the session. The assessment mayor may not be accompanied by customer feedback. When agent assessments are available for an identified communication session, the system preferentially identifies the communication session as one that should be internally reviewed.

An embodiment of a system for analyzing voice-based communication sessions comprises a player, an analyzer and a data store. The player reproduces stored communication sessions. The analyzer identifies a communication session attribute and receives at least one assessment from a reviewer of a communication session. The data store receives and stores the communication session attribute and the at least one assessment in a common format.

An embodiment of an alternative system for analyzing voice-based communication sessions comprises a player, an analyzer and an output device. The player reproduces stored communication sessions. The analyzer identifies a communication session attribute and receives an assessment from a reviewer of a communication session. The output device is coupled to the analyzer and is configured to present a representation of the communication session that comprises the communication session attribute and the at least one assessment.

Still another embodiment of a system for analyzing voice-based communication sessions comprises a player, an analyzer, a data store and an output device. The player reproduces stored communication sessions. The analyzer identifies a communication session attribute and receives at least one assessment from a reviewer of a communication session. The data store receives and stores the communication session attribute and the at least one assessment in a common format. The output device is coupled to the data store and presents a representation of the communication session that comprises the communication session attribute and the at least one assessment.

An embodiment of a method for integrating information concerning a communication session comprises the steps of identifying a communication session attribute, receiving at least one assessment generated by a reviewer of the communication session, and combining the communication attribute with the at least one assessment.

An embodiment of an alternative method for integrating information concerning a communication session comprises the steps of using a recorder/player to record a set of communication sessions, using an attribute of a communication session to identify a subset of the set of communication sessions to analyze, presenting the subset to an internal reviewer, receiving at least one assessment generated by the internal reviewer responsive to a select communication session, combining the at least one assessment with the attribute, after the internal reviewer indicates that the internal review of the communication session is complete, and adding at least one assessment from a customer that was a party to the communication session to the at least one assessment generated by the internal reviewer and the attribute.

Other systems, methods, features and advantages will be or will become apparent to one skilled in the art upon examination of the following figures and detailed description. All such additional systems, methods, features and advantages are defined and protected by the accompanying claims.

BRIEF DESCRIPTION OF THE DRAWINGS

The present systems and methods, as defined in the claims, can be better understood with reference to the following drawings. The components within the drawings are not necessarily to scale relative to each other; emphasis instead is placed upon clearly illustrating the principals involved in integrating information and analyzing recorded communication sessions.

DETAILED DESCRIPTION

Speech analytics (i.e., the analysis of recorded speech or real-time speech) can be used to perform a variety of functions, such as automated communication session evaluation, including scoring, quality monitoring, quality assessment and compliance/adherence verification. By way of example, speech analytics can be used to compare a recorded interaction to a script (e.g., a script that the agent was to use while interacting with a customer during a communication session). In other words, speech analytics can be used to measure how well agents adhere to scripts; identify which agents are "good" at assigned tasks or goals and identify which agents need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection and/or direct customer feedback). As another example, compliance with various policies can be determined. Such may be in the case of, for example, the highly regulated collections industry where agents must abide by many rules when interacting with customers and the public. Accordingly, speech analytics can be used to improve customer agent effectiveness and to reduce corporate liability and risk.

In this regard, various types of recording components can be used to facilitate speech analytics. Specifically, such recording components can perform various functions such as receiving, capturing, intercepting and tapping of data. This can involve the use of active and/or passive recording techniques, as well as the recording of voice and/or screen data.

The present systems and methods for communication session assessment store an element of a session assessment (e.g., the "Quality of Greeting") in the same way that attributes of the communication session, such as "Duration," "Caller's number," etc., are stored. As a result, it is easier to provide machine learning, reporting, further selection, correlation between attributes, etc. when the scores are indistinguishable from the communication session attributes. Alternatively, the present systems and methods for communication session assessment combine or otherwise present communication session attributes with communication session assessments or scores in a common view or format.

A machine learning system integrates communication session attributes (e.g., duration spent on hold) with communication session assessments (e.g., a supervisor's score for quality of customer empathy) and uses all such available inputs to derive neural nets and other machine learning mechanisms; for deriving patterns, trends and correlations. In one embodiment, a customer offers information regarding a communication session (e.g., through an interactive voice response (NR) based survey at the end of a telephone call). Again, by stooling the customer's scores into the same, common data repository, so they can be searched and combined with the other communication session attributes, it is easier to handle the growing set of data about the session—without an arbitrary distinction as is usually imposed between "attributes known about the communication session" and "evaluations made on the communication session." Although the latter are subjective and the former are often objective, the nature and/or source of the information should not impact how or where information about the communication session is stored.

The identification of information types (i.e., specific attributes) as being "inputs" or "outputs" is useful when applying information to a neural network—otherwise, such networks tend to learn very quickly that, for example, "the communication session with the highest overall quality score is the one with the highest individual quality score elements"—rather than realizing that the individual score elements are not going to be available on the data they will be asked to classify.

For example, speech analytics can be used in conjunction with metadata from the recorded communication session including screen data (e.g., screen data captured from an agent's workstation/PC) for evaluation, scoring, analysis, adherence and compliance purposes. The integration of communication session metadata including screen data with communication session evaluations improves the effectiveness and efficiency of quality assurance and other enterprise initiated programs. For example, the integration of communication session information can help companies to identify and locate a recording of one or more communication sessions for which customer feedback is available. An internal reviewer is then instructed to review and evaluate agent performance for the identified communication sessions. As a result, the enterprise improves the effectiveness of its quality assurance program(s), as internal reviews can be verified with customer feedback. Accordingly, the performance of agent supervisors or other reviewers can be measured. In addition, the reviewer's analysis skills can be adjusted over time as the reviewer learns customer preferences as reported in the customer feedback.

A player is coupled or otherwise integrated with an analyzer. In some embodiments, the player includes a recorder. The analyzer receives communication session metadata, communication session audio information, as well as reviewer and customer assessments for recorded communication sessions. In turn, the analyzer generates results regarding the recorded audio information and one or more measures of correlation between the reviewer assessment(s) and the customer assessment(s) of the recorded communication session. The analyzer temporarily stores attributes of the communication session for storage or distribution along with the assessments to external devices. A user of the system for analyzing recorded communication sessions is presented with a subset of all recorded communication sessions. The subset includes those recorded communication sessions for which customer feedback is available. Results, measures of correlation, attributes and assessments can all be stored to a coupled data store. In addition, results, measures of correlation, attributes and assessments can be forwarded to one or more output devices configured to present the information to interested parties.

In an alternative embodiment, the internal party (agent) to a communication session is also encouraged to enter their own assessment (e.g., scores associated with identified goals). This can be accomplished via any number of input devices any time after the communication session is terminated. When the input device does not require the agent to speak to enter an assessment, the assessment can be entered into metadata associated with the communication session during an active communication session. Agents, in some cases, are more critical of their skills and can highlight a call that they would like to review with their supervisor rather than just have random ones selected. In other cases, the agent may be particularly pleased with how they managed a difficult situation. The addition of an agent generated assessment of the communication session enables the agent and a supervisor to review circumstances that contributed to a desired result. The addition of an agent generated assessment provides a mechanism for an agent to identify efficiently recorded information that can be used to support performance claims.

Accordingly, the present system enables a learning and review process that provides a correlation between an internally generated review of a recorded communication session and a customer's view of the same session. In this way, an enterprise can maximize the effectiveness of an internal review program by not only reviewing the agent's presentation in the communication session, but reviewing the reviewer's assessment of the effectiveness of the session in comparison with feedback from the customer that was a party to the original session.

Moreover, the coupled data store contains an accessible cache of the results, measures of correlation, attributes and assessments generated or otherwise collected in association with each analyzed recording. Consequently, a user of the system may choose to wait for all selected recordings to be analyzed. Alternatively, a user may start performing directed searches on the subset of analyzed recordings. In the latter case, results from searches performed to date may be automatically reapplied to each recorded communication or as the session (e.g., a call) is reviewed in near real-time without having to wait for the entire communication session to be processed. By storing intermediate results in an accessible cache, an index or transcript can be observed when a previously analyzed session is the subject of a subsequent search by this or another user. Thus, the present user may not be forced to wait until the recorded communication session is analyzed again.

Figure 1:
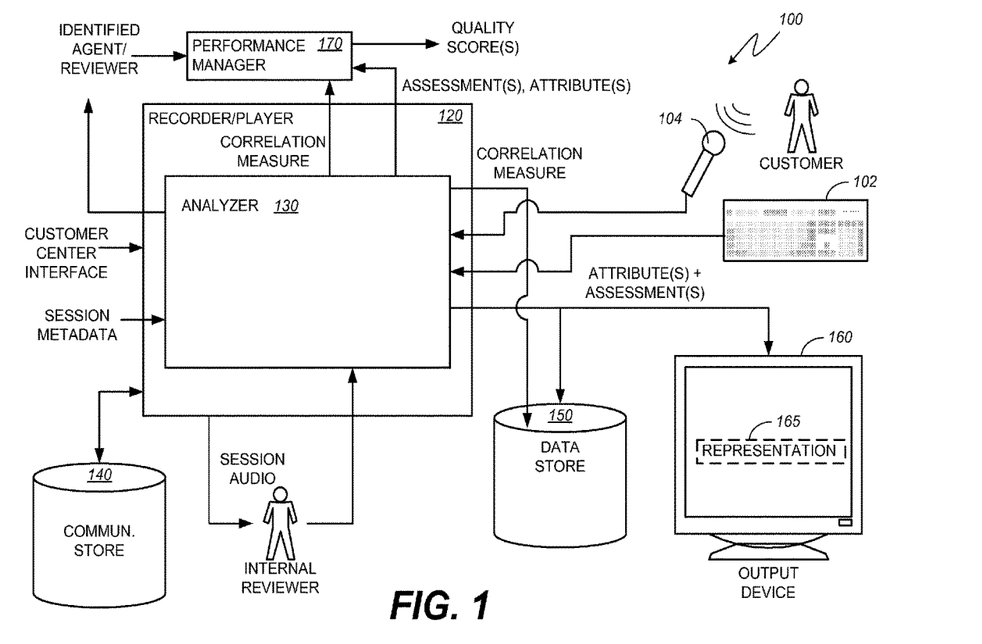
FIG. 1 is a schematic diagram illustrating an embodiment of a system for analyzing recorded communication sessions.

FIG. 1 is a schematic diagram illustrating an embodiment of a system 100 for analyzing and/or reviewing recorded voice-based communication sessions. The system 100 includes recorder/player 120, which is communicatively coupled to communication store 140, data store 150, output device 160 and performance manager 170. Recorder/player 120 receives a series of voice communications (e.g., customer center calls) from a customer-center interface. Recorder/player 120 records the communication sessions and stores information such as session metadata regarding each of the sessions in communication store 140.

In the illustrated embodiment, analyzer 130 is a component part of recorder/player 120. In alternative embodiments, analyzer 130 is communicatively coupled to recorder/player 120 and as will be explained in greater detail below includes a control interface to enable reviewer and customer interaction with recorder/player 120.

In operation, recorder/player 120 receives audio information and session metadata via a customer-center interface. A customer center coupled to the interface may include, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example.

When the audio recordings stored in communications store 140 are recorded in stereo (i.e., when separate channels are used to record each party to a conversation), a reviewer can direct the recorder/player 120 to replay the communication session from either party or a specified party (e.g., a customer-center agent or customer).

Analyzer 130 receives spoken assessments and perhaps other information from a customer via microphone 104. Alternatively, customer generated assessments and information can be received via a handset coupled to a telephone, a mobile communication device, or other computing devices. For example, analyzer 130 may receive customer feedback and communication session assessments via keyboard 102 or some other input device communicatively coupled and configured to communicate information to analyzer 130. Keyboard 102 or other input devices may be integrated or otherwise configured to function with application software including web browsers (not shown) to coordinate the receipt and storage of customer feedback.

In addition to receiving information from a customer associated with an identified communication session, analyzer 130 receives internal reviewer assessments via recorder/player 120. As shown in the illustrated example, a reviewer listens to session audio and communicates one or more session assessments to analyzer 130. Session assessments may be communicated via spoken word or electronically via any number of man-machine interfaces. As described in further detail below, analyzer 130 preferably functions together with output device 160 to withhold details concerning available customer feedback until the reviewer has completed their review and assessed or otherwise scored the communication session. In this way, the reviewer's assessment of a communication session will not be tainted by the customer feedback and the reviewer can adjust their approach when assessing other communication sessions.

Data store 150 is coupled to recorder/player 120 and analyzer 130 and is configured to receive attributes, assessments and at least one measure of correlation comparing the reviewer's assessment(s) with the customer generated assessment(s) of a select communication session from analyzer 130. In embodiments where analyzer 130 includes a speech analyzer, data store 150 is available to store interim and final speech analysis results for the select communication session. In addition to these outputs, analyzer 130 is further coupled to performance manager 170.

As illustrated in FIG. 1, results generated by analysis engine 130 are forwarded to a first suitably configured output device 160. Output device 160 receives information regarding communication sessions, namely, session metadata, assessments, attributes, measures of correlation, etc. from analyzer 130 and/or data store 150 and converts the received information into representation 165. In the illustrated embodiment, representation 165 is a graphical depiction presented on a monitor. It should be understood that in alternative embodiments, output device 160 can be a printer, a plotter, a projector, etc. to graphically present communication session related information as well as speakers to reproduce audio information. Moreover, representations 165 responsive to the various assessments, attributes, measures of correlation, etc. can be stored either in data store 150 or other storage devices coupled to system 100. These representations and/or the underlying data can be cataloged for future review and additional analysis or review.

As also shown in FIG. 1, information regarding an agent, correlation measures, attributes and assessments generated or temporarily stored by analyzer 130 are forwarded to performance manager 170. Performance manager 170 is a hardware device that generates a quality score as a function of the identified agent and one or more of the attributes and assessments. When the performance manager 170 is configured to assess agent performance, the quality score will be a function of the reviewer and one or more of the assessments (including agent generated assessments) and the measures of correlation. When the performance manager 170 is configured to assess reviewer performance, the quality score will be a function of the reviewer and one or more of the assessments (including customer generated assessments) and the measures of correlation.

As explained above, metadata concerning each separate communication session can be forwarded to adjust the analyzer 130. In some embodiments, a user of the system directs the analyzer 130 to use specific language, speaker and vocabulary models. In alternative embodiments, the system uses metadata describing the communication session such as agent and customer identifiers when the communication is a call connected through a customer center. The agent and customer identifiers and perhaps other information can be used to refine the analyzer 130 in real time when metadata identifies the speaker. Generally, a speech analysis engine (a component of the analyzer 130) is trained or otherwise optimized to a cross-section of speakers from the population. Optimization of the speech analysis engine to a population of speakers provides the best result for an unknown or random speaker. However, where sufficient information is available concerning a specified speaker, the speech analysis engine uses one or more adaptive techniques to evolve or modify to reduce errors between phonemes identified from the present speaker and those observed across a cross-section of a population speaking the same language as the present speaker.

In the illustrated embodiment, communication store 140 and data store 150 are separate data stores. When voice communication sessions are recorded and stored in a digital format, communication store 140 and data store 150 may be integrated or otherwise consolidated in a central set of one or more data storage devices.

It should be further understood that the present speech analysis system 100 is not limited to single physical devices, that is, in alternative embodiments one or more of communication store 140, data store 150, output device 160, recorder/player 120 and analyzer 130 can be duplicated as may be required to permit multiple users to analyze recorded communication sessions simultaneously. Moreover, one or more of communication store 140 and data store 150 may comprise multiple physical devices distributed across multiple locations.

In operation, the analyzer 130 of FIG. 1 performs various functions. These functions include delineating an audio component of a voice communication session into fragments or segments. Each of the fragments is attributable to a party of the communication session and represents a contiguous period of time during which that party was speaking. By way of example, one such fragment could involve a recording (e.g., 4 seconds in duration) of the speech of an agent during a communication session with a customer, in which the agent greeted the customer.

In some embodiments, the parties to a communication session are recorded separately. In other embodiments, a communication session can be recorded in stereo, with one channel for the customer and one for the agent. In yet further embodiments, the parties to the call are recorded as a single "mixed" channel.

A vox detection analyzer is used to determine when each party is talking. Such an analyzer typically detects an audio level above a pre-determined threshold for a sustained period (i.e., the "vox turn-on time"). Absence of speech is then determined by the audio level being below a pre-determined level (which may be different from the first level) for a pre-determined time (which may be different from the previous "turn-on" time). Portions of a raw or real-time audio recording of a communication session where the absence of speech is detected can be dropped or otherwise edited to conserve data storage resources. Moreover, identifying the presence of speech information on each of the two channels of a recorded session enables the identification of who, if anyone, is speaking at any given time.

Once audio presence is determined, the communication session (e.g., a customer-center generated call) can be broken into "fragments" or "segments" representing the period in which each party speaks during the communication session. In this regard, a fragment can be delimited by one or more of the following: i) the start or end of the session; ii) the other party starting to speak and the silence of a previous speaking party; iii) a "significant" pause—a period greater than a typical interval between one party finishing speaking and the other party beginning to speak. This interval may be pre-determined or determined by examining the actual intervals between the patties speaking on any particular call. If the session involves more than a few alternations of which party is speaking, these alternations can typically be grouped. For instance, one group could be "normal turns of dialog" in which the intervals are on the order of a fraction of a second to one or two seconds and another group could be "delays" in which the dialog is hesitant or significantly delayed for some reason; and iv) a "significant interruption"—a period during which both parties are speaking and which is longer than typical confirmatory feedback (e.g., the utterance "uh-huh") that is intermittently spoken during a conversation.

Figure 2:
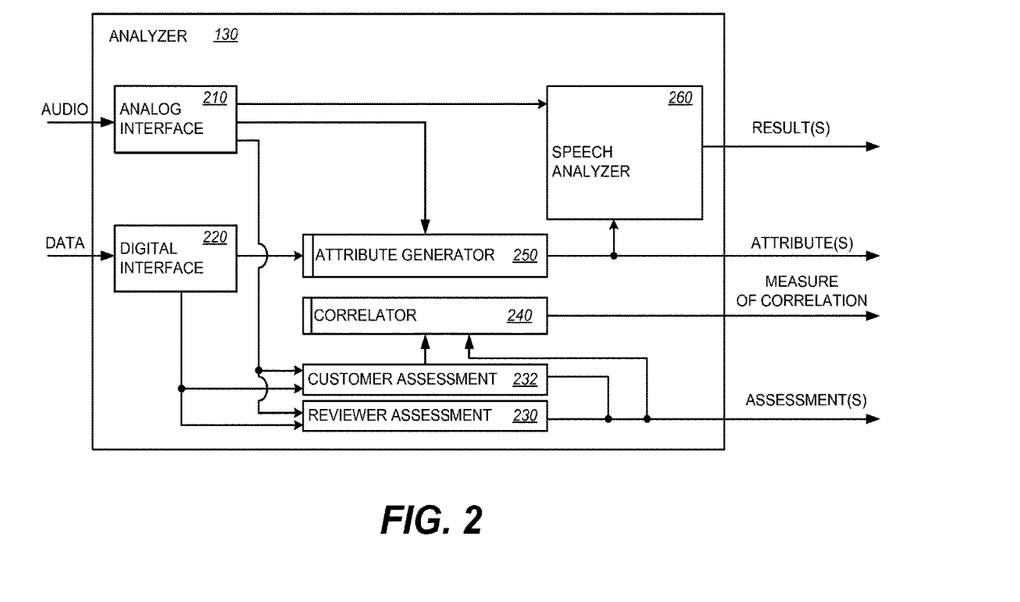
FIG. 2 is a functional block diagram illustrating an embodiment of the data storage device of FIG. 1.

FIG. 2 is a functional block diagram illustrating an embodiment of the analyzer 130 FIG. 1. Analyzer 130 includes analog interface 210, digital interface 220, correlator 240, attribute generator 250 and speech analyzer 260. Analyzer 130 receives audio information and additional data via analog interface 210 and digital interface 220, respectively. Audio information includes audio from the playback of identified communication sessions via recorder/player 120. Data may include metadata associated with the recorded communication session as extracted or otherwise generated by recorder/player 120 or data integrated from an agent and/or a reviewer's workstation. Data from an agent workstation is associated with the recording during and/or close to when the communication session is first recorded. Data from a reviewer or other observer of the recording may be integrated at any other time subsequent to the initial recording session. Metadata may include information identifying speaker(s), time, language(s), location(s), the hardware and configuration parameters used to record the communication session, etc. In addition to the above described metadata and audio data, results generated by analysis engine 130 may include annotation information such as indices or markers useful for presenting the results to a user of the speech analysis system 100 (FIG. 1).

As illustrated in FIG. 2, attribute generator 250 may receive metadata or other inputs from one or both of analog interface 210 and digital interface 220. Attribute generator 250 receives data via digital interface 220 and metadata via analog interface 210 regarding a recording of an identified communication session and forwards one or more attributes or characteristics associated with the recording to speech analyzer 260. As further illustrated in FIG. 2, attributes can be communicated to and/or stored in devices external to analyzer 130.

Analyzer 130 receives and holds reviewer assessment 230 and customer assessment 232 in appropriately configured data stores. As illustrated in FIG. 2, both reviewer assessment 230 and customer assessment 232 may be received in audio (i.e., via analog interface 210) format or in a digital format via digital interface 220. Correlator 240 receives reviewer assessment(s) 230 and customer assessment(s) and generates one or more measures of correlation between the customer and reviewer assessment(s). Various measures of correlation are described in greater detail in association with FIG. 4B. As in the case of attributes above, one or more measures of correlation can be communicated to and/or stored in devices external to analyzer 130. Speech analyzer 260 receives and processes the audio information from recorder/player 120.

Speech analyzer 260 may comprise one or both of a phonetic analyzer and a large vocabulary speech recognition analyzer. Moreover, speech analyzer 260 may receive text and information in other digital formats via digital interface 220. Speech analyzer 260 may receive input parameters that are forwarded or otherwise communicated to internal language, speaker, and vocabulary models to refine or otherwise adjust the speech analyzer 260 to identify accurately recorded communication sessions that include an identified language, speaker, dialect, etc.

Results generated by speech analyzer 260 may include metadata identifying various characteristics of the recorded voice communication session as well as other information associated with an identified phrase or utterance of interest to a reviewer and/or an automated assessment process applied to the audio information. As with results and attributes, correlation measures and for that matter, customer and reviewer assessments can be communicated to and/or stored in devices external to analyzer 130.

Figure 3:
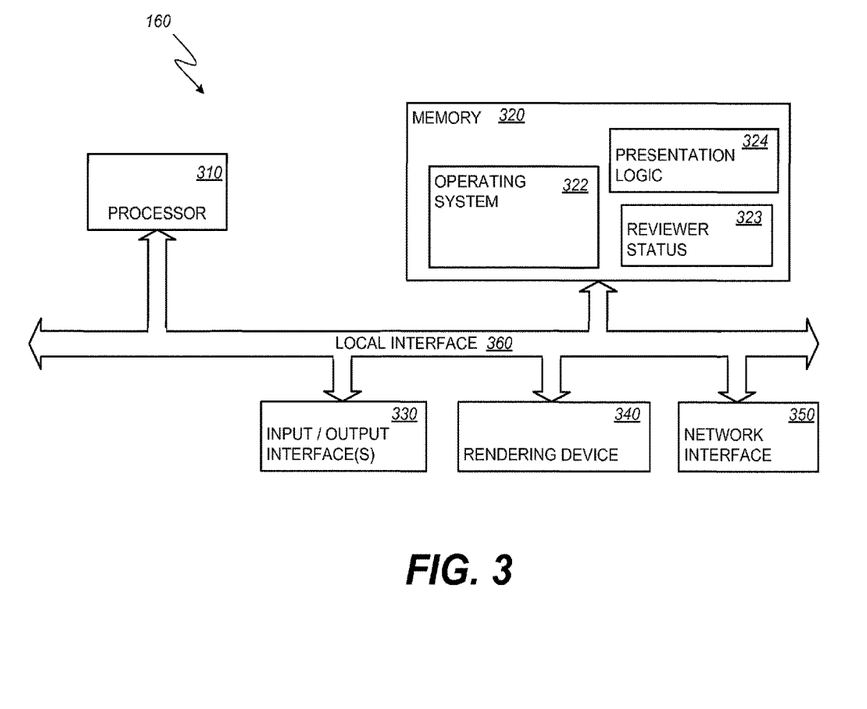
FIG. 3 is a functional block diagram illustrating an embodiment of the output device of FIG. 1.

FIG. 3 is a functional block diagram illustrating an embodiment of the output device 160 of FIG. 1. Generally, in terms of hardware architecture, as shown in FIG. 3, output device 160 is a general purpose computing device or other hardware device that includes processor 310, memory 320, input/output (I/O) interface(s) 330 and network interface 350. Processor 310, memory 320, I/O interface(s) 330, rendering device 340 and network interface 350 are communicatively coupled via local interface 360. The local interface 360 can be, for example but not limited to, one or more buses or other wired or wireless connections, as is known in the mi. The local interface 360 may have additional elements, which are omitted for simplicity, such as controllers, buffers (caches), drivers, repeaters, and receivers, to enable communications. Further, the local interface 360 may include address, control, power and/or data connections to enable appropriate communications among the aforementioned components. Moreover, local interface 360 provides power to each of the processor 310, memory 320, I/O interface(s) 330, rendering device 340 and network interface 350 in a manner understood by one of ordinary skill in the art.

Processor 310 is a hardware device for executing software, particularly that stored in memory 320. The processor 310 can be any custom made or commercially available processor, a central processing unit (CPU), an auxiliary processor among several processors associated with output device 160, a semiconductor based microprocessor (in the form of a microchip or chip set), or generally any device for executing software instructions.

Memory 320 can include anyone or combination of volatile memory elements (e.g., random-access memory (RAM), such as dynamic random-access memory (DRAM), static random-access memory (SRAM), synchronous dynamic random-access memory (SDRAM), etc.) and non-volatile memory elements (e.g., read-only memory (ROM), hard drive, tape, compact disk read-only memory (CD-ROM), etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in memory 320 may include one or more separate programs, each of which comprises an ordered listing of executable instructions for implementing logical functions. In the example embodiment illustrated in FIG. 3, the software in the memory 320 includes operating system 322 and presentation logic 324. Memory 320 also includes data items such as reviewer status 323. The operating system 322 essentially controls the execution of other computer programs and provides scheduling, input-output control, file and data management, memory management, communication control and related services.

Presentation logic 324 includes one or more programs and one or more data elements that enable output device 160 to generate, store and communicate data from data store 150 and recorder/player 120. Presentation logic 324 may include one or more buffers and parameter stores for holding configuration information and or data as may be required to interface with any number of printers and display devices that may be coupled to output device 160.

Presentation logic 324 is one or more source programs, executable programs (object code), scripts, or other entities that include a set of instructions to be performed. When implemented as source programs, the programs are translated via a compiler, assembler, interpreter, or the like, which may or may not be included within memory 320, to operate properly in connection with O/S 322.

I/O interface(s) 330 includes multiple mechanisms configured to transmit and receive information via output device 160. These mechanisms support human-to machine (e.g., a keyboard) and machine-to-human information transfers. Such human-to-machine interfaces may include touch sensitive displays or the combination of a graphical-user interface and a controllable pointing device such as a mouse. Moreover, these mechanisms can include voice activated interfaces that use a microphone or other transducer.

Rendering device 340 enables output device 160 to communicate information with various network coupled display devices such as printers, plotters, monitors, etc. Rendering device 340 is a hardware device that is responsible for producing graphical abstractions in accordance with one or more programs and data. Rendering device 340 receives instructions and data from processor 310 and memory 320 and generates one or more output signals suitable for directing the presentation of information via a designated output device.

Network interface 350 enables output device 160 to communicate with various network-coupled devices, including data store 150 (FIG. 1). Network interface 350 performs a variety of functions including, for example the signal conditioning and format conversions to communicate data through speech analysis system 100. Preferably, network interface 350 is compatible with one or both of the Gigabit Ethernet standards (i.e., IEEE 802.3z Fiber Optic Gigabit Ethernet and IEEE 802.3ab Twisted-Pair Gigabit Ethernet) and the TCPIIP protocol. It should be understood that other data-network interfaces compatible with other network protocols including wireless protocols may also be used.

When output device 160 is in operation, the processor 310 is configured to execute software stored within the memory 320, to communicate data to and from the memory 320, and to control operations of the output device 160 pursuant to the software. The presentation logic 324 and the OIS 322, in whole or in part, but typically the latter, are read by the processor 310, perhaps buffered within the processor 310, and then executed.

When presentation logic 324 and reviewer status 323 are implemented in a memory, as is shown in FIG. 3, it should be noted that these software and data elements can be stored on any computer-readable medium for use by or in connection with any computer related system or method. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a ROM (electronic), an erasable programmable read-only memory (EPROM), an electrically erasable programmable read-only memory (EEPROM), or Flash memory) (electronic), an optical fiber (optical), and a CDROM (optical). Note that the computer-readable medium could even be paper or another suitable medium upon which the program is printed, as the program can be electronically captured, via for example optical scanning of the paper or other medium, then compiled, interpreted or otherwise processed in a suitable manner if necessary, and then stored in a computer memory.

In an alternative embodiment, where one or more of the presentation logic 324 and reviewer status 323 are implemented in hardware, the presentation logic 324 and reviewer status 323 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field-programmable gate array (FPGA), flip-flops, etc.

Figure 4A:
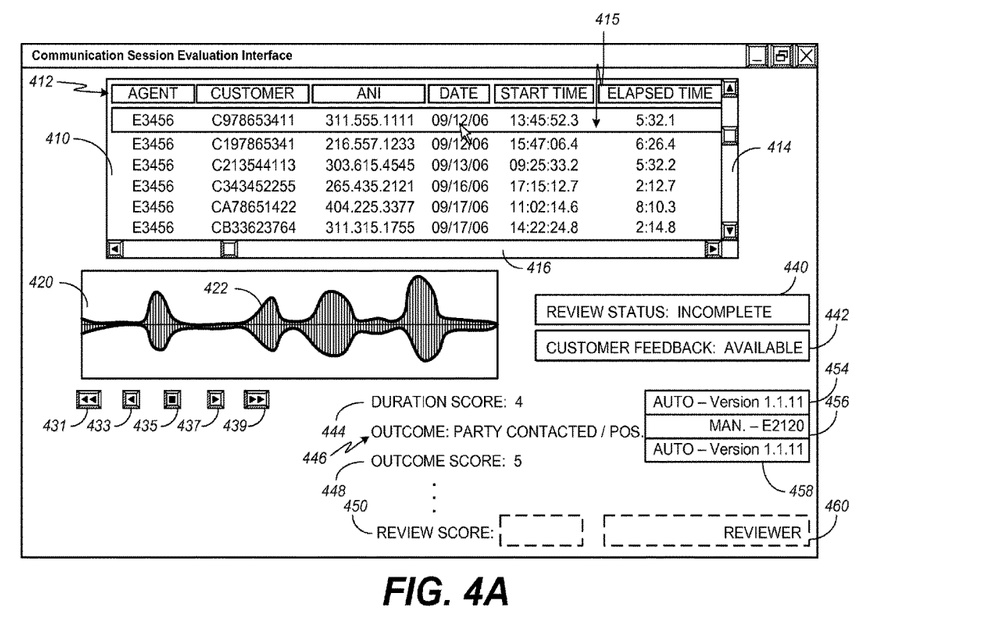
FIGS. 4A and 4B are schematic diagrams illustrating embodiments of the representation generated by the output device of FIG. 1.

FIG. 4A is a schematic diagram illustrating an embodiment of the representation 165 of FIG. 1. In the illustrated embodiment, representation 165 is a graphical user interface that includes a number of input/output features to enable user interaction with recorder/player 120 and analyzers 130. For example, representation 165 includes a host of fields configured to present analyzer results to a user of the speech analysis system 100. For example, output field 410 includes a depiction of a subset of identified recordings to process. Output field 410 includes text items associated with session recordings that a reviewer is assigned to observe. Output field 410 is associated with vertical scroll bar 414 and horizontal scroll bar 416 for navigating across the displayed items to observe the text items. In the illustrated example, the recorded communication sessions are customer-center generated calls to customers. Each identified session with available customer feedback is represented by a horizontally arranged record. Records include fields associated with an agent identifier, a customer identifier, a customer phone number as determined via automatic number identification (ANI), date, start time and elapsed time of the recording. Additional fields may include a script identifier or some other indication of the intent or nature of the communication session, whether the communication session was customer or agent initiated, etc.

A user of the speech analysis system 100 can select a particular recording for review by positioning selection bar 415 over a record-of-interest and entering a select input. In response to the user's selection of a particular record-of-interest, recorder/player 120 retrieves the identified recording and field 420 and related input controls are presented in the graphical user interface. For example, a portion of the presently selected recording is presented in the form of an audio energy envelope 422 in field 420. Representation 165 further includes a set of playback controls to control recorder/player 120. Playback controls include: fast-reverse selector 431, reverse selector 433, stop selector 435, play selector 437 and fast-forward selector 439. These playback controls can be used to direct player/recorder 120 through the present recorded communication session.

As further illustrated in FIG. 4A, additional information is provided to a reviewer or other user of output device 160. For example, communication session evaluation interface also includes field 440, where review status information is presented; and field 442, where the availability of customer feedback is presented. In addition to these additional information fields, the communication session evaluation interface further presents a set of review information fields such as field 444, field 446, field 448, and field 450. In field 444, a duration score is presented to the reviewer/observer. In field 446, a communication session outcome is summarized. In field 448, an outcome score is presented to the reviewer/observer. Field 450 is available to present a total review score for the communication session once it has been determined. Field 454 indicates the origin of the duration score and identifies the version of the software that was used to generate the score. Alternatively, field 454 may include information concerning the algorithm that determined the score or the location in the code where the score was generated. Field 456 indicates the origin of the outcome information and as in this example, when the information is manually generated, includes an identifier for the employee that entered the outcome information. Field 458 indicates the origin of the outcome score and identifies the version of the software that was used to generate the score. As with field 454, field 458 may include alternative information identifying the algorithm that determined the outcome score or the location in the code where the outcome score was generated. Field 460 presents a name or other identifier associated with the reviewer of the communication session.

Thus, representation 165 includes communication session attributes that are automatically generated such as those presented in field 410; communication session attributes that are manually generated or dependent upon a reviewer input, such as the attribute presented in field 440; as well as automatically and manually generated reviewer assessments.

Figure 4B:
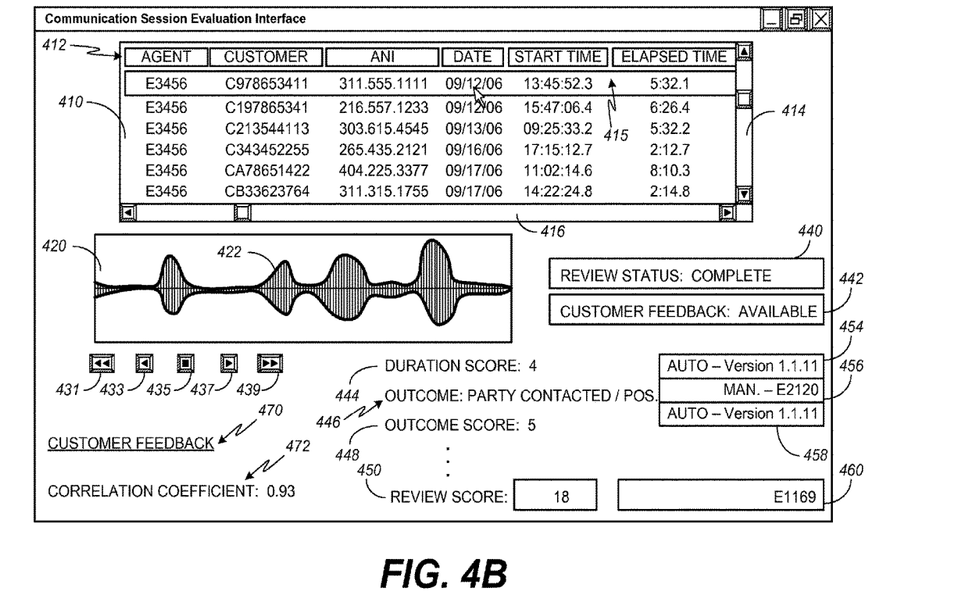

Once the reviewer has completed reviewing the communication session as reflected in field 440 of FIG. 4B, link 470 is presented, which provides access to customer feedback information. In addition to link 470, the communication session evaluation interface presents a measure of correlation between the reviewer's analysis of the communication session and information provided by a customer in the customer feedback. In the illustrated example, the measure of correlation is a correlation coefficient presented in field 472. Thus, representation 165 in the embodiment illustrated in FIG. 4B further includes a link to one or more customer assessments related to the present communication session under review.

A correlation coefficient indicates the strength and direction of a linear relationship between two random variables. In statistics, correlation refers to the departure of two variables from independence, although correlation does not necessarily imply causality. In this broad sense, several coefficients measure the degree of correlation, each adapted to the nature of the data. A number of different coefficients are used for different situations. The best known is the Pearson product-moment correlation coefficient, which is obtained by dividing the covariance of the two variables by the product of their standard deviations. The Pearson product-moment correlation coefficient is a parametric statistic, and it may be less useful if the underlying assumption of normality is violated. Non-parametric correlation methods, such as Spearman's p and Kendall's T may be useful when distributions are not normal; they are a little less powerful than parametric methods if the assumptions underlying the latter are met, but are less likely to give distorted results when the assumptions fail. Spearman's rank correlation coefficient, often denoted by the Greek letter ρ (rho) assesses how well an arbitrary monotonic function could describe the relationship between two variables, without making any assumptions about the frequency distribution of the variables. Unlike the Pearson product-moment correlation coefficient, it does not require the assumption that the relationship between the variables is linear, nor does it require the variables to be measured on interval scales; it can be used for variables measured at the ordinal level. In principle, ρ is simply a special case of the Pearson product-moment coefficient in which the data are converted to ranks before calculating the coefficient. In practice, however, a simpler procedure is normally used to calculate ρ. The raw scores are converted to ranks, and the differences D between the ranks of each observation on the two variables are calculated. ρ is then given by:

$$\rho = 1 - \frac{6\sum D^2}{N(N^2-1)} \qquad \text{Eq. 1}$$

where:
D=the difference between the ranks of corresponding values of X and Y, and
N=the number of pairs of values.

Spearman's rank correlation coefficient is equivalent to the Pearson product-moment correlation on ranks. The formula above is a short-cut to its product-moment form, assuming no tie. The product-moment form can be used in both tied and untied cases.

Kendall's τ is used to measure the degree of correspondence between two rankings and assess the significance of this correspondence. Kendall's τ is defined as follows:

$$\tau = \frac{2P}{\frac{1}{2}n(n-1)} - 1 = \frac{4P}{n(n-1)} - 1 \qquad \text{Eq. 2}$$

where:
n=the number of items, and
P=the sum, over all the items, of items ranked after the given item by both rankings. P can also be interpreted as the number of concordant pairs subtracted by the number of discordant pairs. The denominator in the definition of τ can be interpreted as the total number of pairs of items. So, a high value of P means that most pairs are concordant, indicating that the two rankings are consistent. Note that a tied pair is not regarded as concordant or discordant.

A correlation ratio can be used to detect functional dependencies in nonlinear data. Other more general measures exist that may be substituted for any of the above-mentioned measures of correlation as may be desired.

Figure 5:
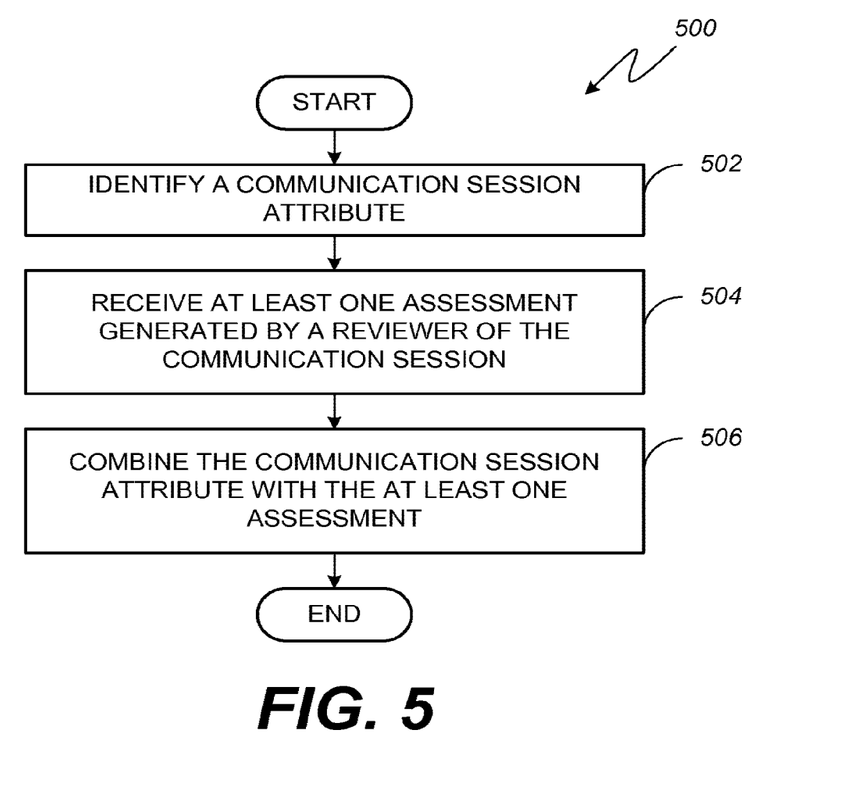
FIG. 5 is flow diagram illustrating an embodiment of a method for integrating information concerning a communication session.

FIG. 5 is flow diagram illustrating an embodiment of a method 500 for integrating information concerning a communication session. Method 500 begins with block 502 where a communication session attribute is identified. In block 504, at least one assessment generated by a reviewer of the communication session is received. Thereafter, in block 506, the communication session attribute is combined with the at least one communication session assessment.

Figure 6:
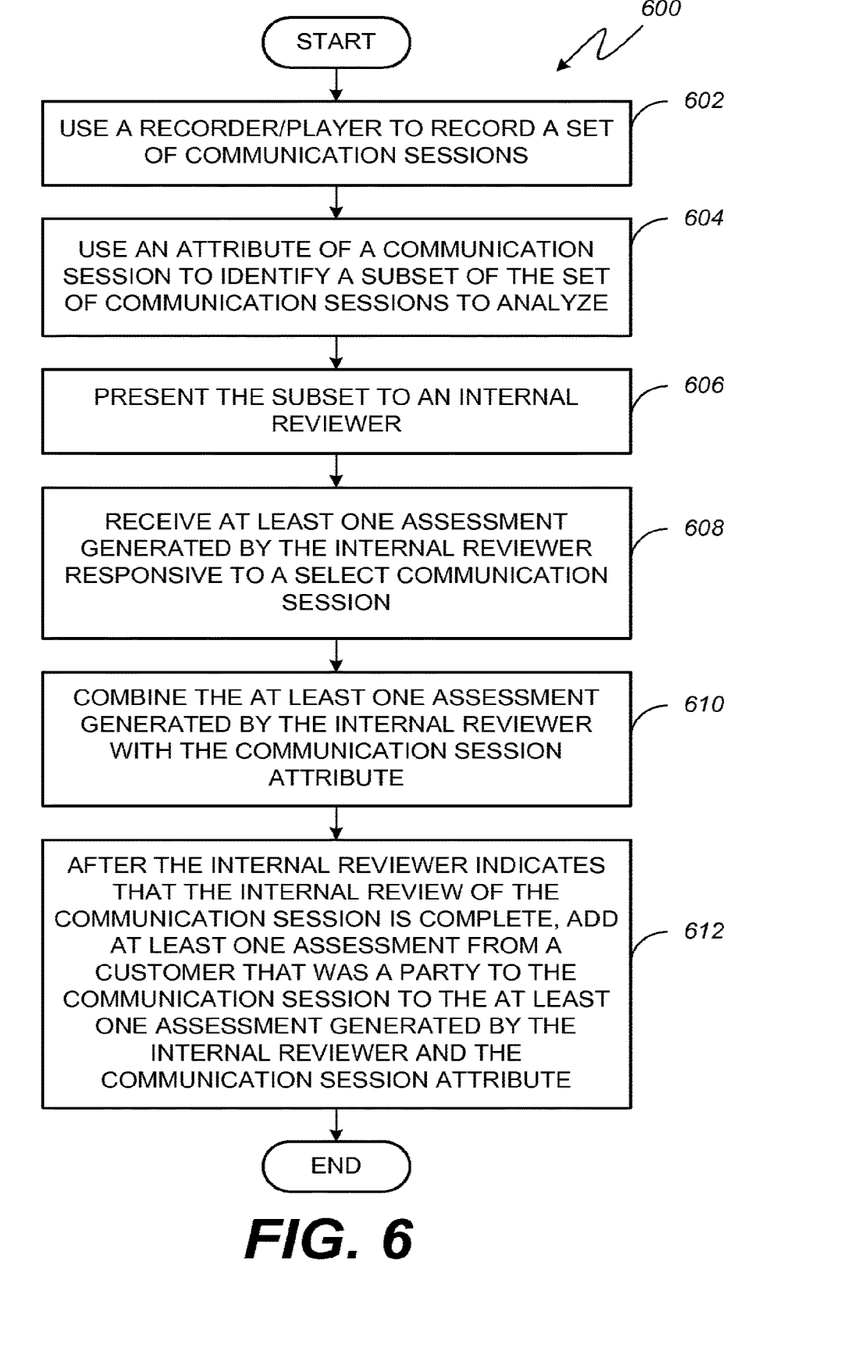
FIG. 6 is a flow diagram illustrating an alternative embodiment of a method for analyzing a communication session.

FIG. 6 is a flow diagram illustrating an embodiment of a method 600 for analyzing a communication session. Method 600 begins with block 602 where a recorder/player is used to record a set of communication sessions. Thereafter, in block 604, a subset of the set of the recorded communication sessions is identified to identify candidate communication sessions to analyze. In block 606, the subset is presented to an internal reviewer. An internal reviewer can be a peer, a supervisor, or an entirely disinterested party acting on behalf of the enterprise to analyze the subset of communication sessions. In block 608, at least one assessment from the internal reviewer is added or otherwise integrated in an overall assessment of a select communication session selected from the subset of communication sessions. After the internal reviewer indicates that the review is complete, as indicated in block 610, at least one assessment from a customer party to the select communication session is presented with the assessment(s) from the internal reviewer. Next, as indicated in block 612, the assessment(s) from the customer are compared with the assessment(s) generated by the internal reviewer. Thereafter, as shown in block 614, a communication session attribute is presented with the assessment(s) from the customer and the internal reviewer.

Figure 7:
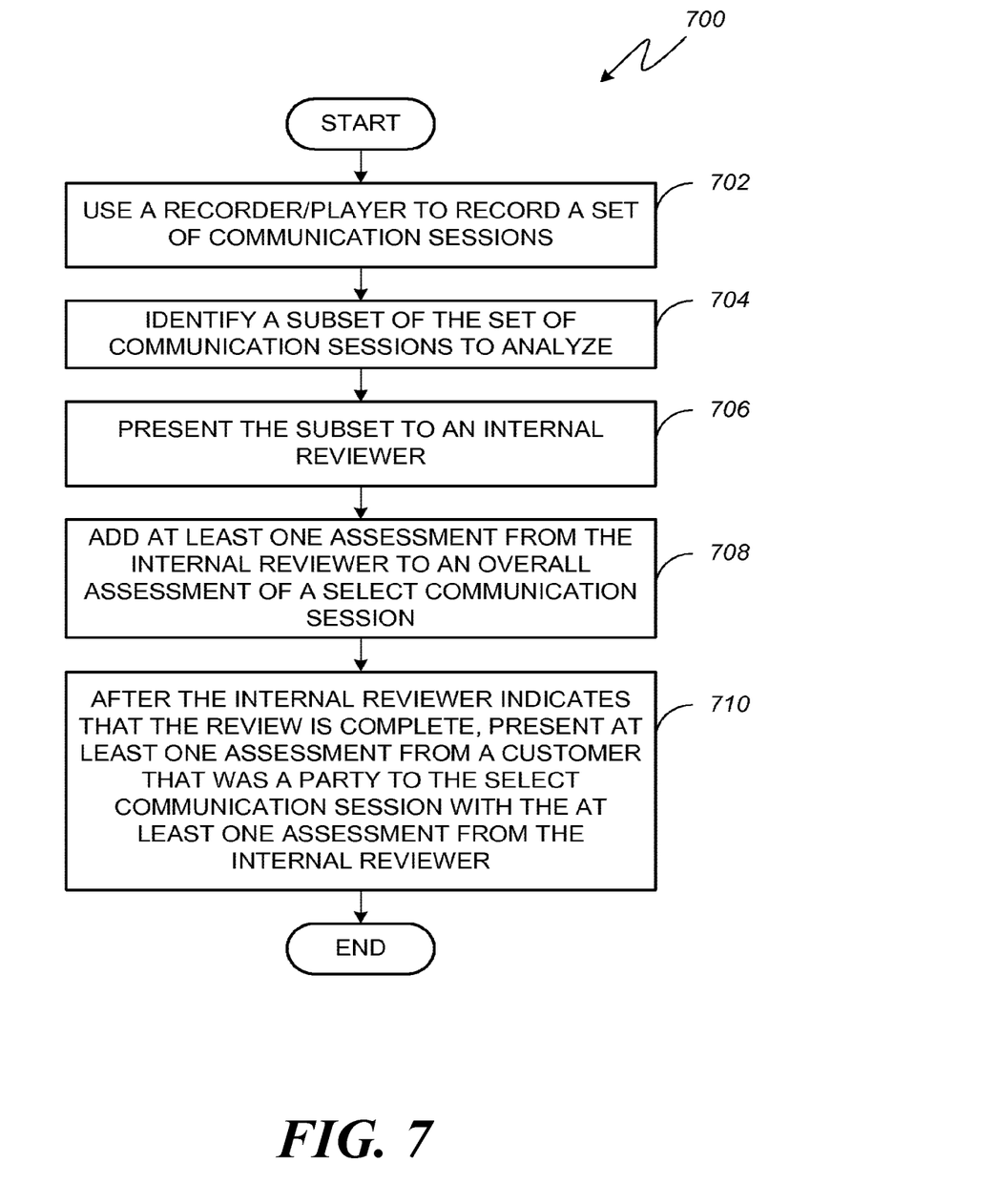
FIG. 7 is a flow diagram illustrating an additional embodiment of a method for integrating information concerning a communication session.

FIG. 7 is a flow diagram illustrating an alternative embodiment of a method 700 for integrating information concerning a communication session. Method 700 begins with block 702 where a recorder/player is used to record a set of communication sessions. Thereafter, in block 704, a subset of the set of the recorded communication sessions is identified to identify candidate communication sessions to analyze. In block 706, the subset is presented to an internal reviewer. An internal reviewer can be a peer, a supervisor, or an entirely disinterested party acting on behalf of the enterprise to analyze the subset of communication sessions. In block 708, at least one assessment from the internal reviewer is added or otherwise integrated in an overall assessment of a select communication session selected from the subset of communication sessions. After the internal reviewer indicates that the review is complete, as indicated in block 710, at least one assessment from a customer that was a party to the select communication session is presented with the assessment(s) from the internal reviewer.

Figure 8:
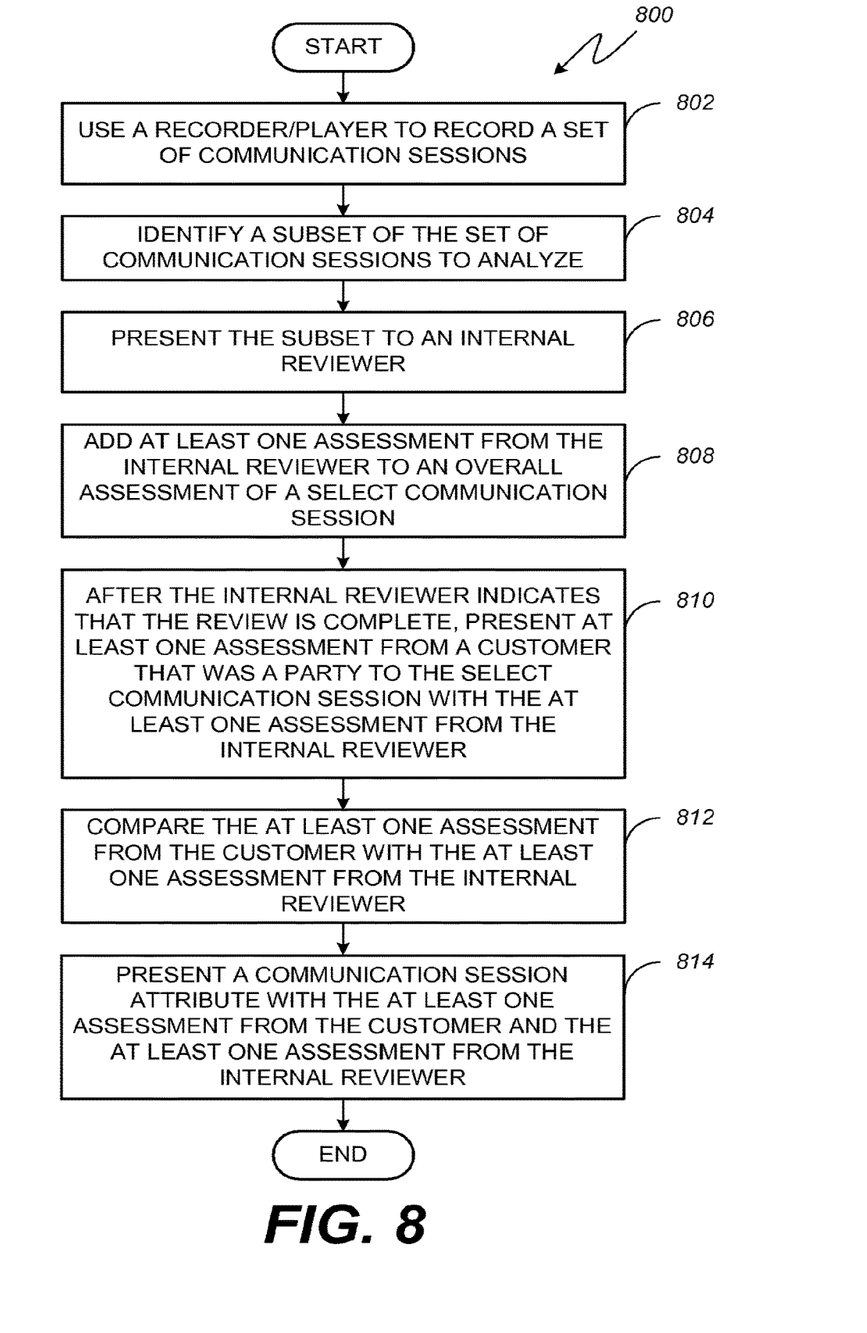
FIG. 8 is a flow diagram illustrating an alternative embodiment of a method for analyzing a communication session.

FIG. 8 is a flow diagram illustrating an embodiment of a method 800 for analyzing a communication session. Method 800 begins with block 802 where a recorder/player is used to record a set of communication sessions. Thereafter, in block 804, a subset of the set of the recorded communication sessions is identified to identify candidate communication sessions to analyze. In block 806, the subset is presented to an internal reviewer. An internal reviewer can be a peer, a supervisor, or an entirely disinterested party acting on behalf of the enterprise to analyze the subset of communication sessions. In block 808, at least one assessment from the internal reviewer is added or otherwise integrated in an overall assessment of a select communication session selected from the subset of communication sessions. After the internal reviewer indicates that the review is complete, as indicated in block 810, at least one assessment from a customer party to the select communication session is presented with the assessment(s) from the internal reviewer. Next, as indicated in block 812, the assessment(s) from the customer are compared with the assessment(s) generated by the internal reviewer. Thereafter, as shown in block 814, a communication session attribute is presented with the assessment(s) from the customer and the internal reviewer.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency 25 and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

The foregoing description has been presented for purposes of illustration and description. It is not intended to be exhaustive or to limit the scope of the claims to the precise forms disclosed. Modifications or variations are possible in light of the above teachings. The embodiments discussed, however, were chosen and described to enable one of ordinary skill to utilize various embodiments of the present systems and methods. All such modifications and variations are within the scope of the appended claims when interpreted in accordance with the breadth to which they are fairly and legally entitled.

What is claimed is:

1. A system for analyzing voice-based communication sessions, comprising:
   a player configured to reproduce a recorded communication session;
   an analyzer configured to generate a communication session attribute and to receive at least one assessment of the communication session from an automated reviewer, wherein the communication session attribute is generated from audio data received from the reproduction of the communication session via the player, wherein the analyzer is further configured to compare at least one assessment from a customer with the at least one assessment from the automated reviewer, wherein comparing comprises generating a measure of the correlation of the at least one assessment from the customer with the at least one assessment from the automated reviewer and using the measure of correlation to confirm or modify future assessments of the automated reviewer; and
   a data store configured to store the at least one assessment, an overall assessment, and the communication session attribute into a single class in an object-oriented database such that the overall assessment and the at least one assessment are indistinguishable from the communication session attribute when stored,
   wherein the analyzer is further configured to derive a neural network using the single class.

2. The system of claim 1, wherein the measure of the correlation is applied to an e-learning tool.

3. The system of claim 1, wherein the analyzer is configured to prompt an internal reviewer to add an assessment to the communication session.

4. The system of claim 1, wherein the analyzer is responsive to metadata concerning the stored communication session.

5. The system of claim 1, further comprising an automated performance manager coupled to the analyzer and configured to receive information responsive to an identified agent.

6. The system of claim 5, wherein the automated performance manager is configured to generate at least one agent quality score.

7. The system of claim 6, wherein the automated performance manager is responsive to at least one key performance indicator.

8. The system of claim 1, wherein the communication session attribute is objective, the at least one assessment is subjective, and the overall assessment is subjective.

9. The system of claim 1, wherein the single class is used for deriving patterns, trends and correlations between the at least one assessment, the overall assessment, and the communication session attribute.

10. A method for integrating information concerning a communication session, comprising:
- using a recorder/player to record a set of communication sessions;
- using a communication session attribute to identify a subset of the set of communication sessions to analyze;
- presenting the subset to an automated reviewer;
- receiving at least one assessment of a select communication session from the automated reviewer, wherein the select communication session is one of the subset;
- comparing at least one assessment from a customer with the at least one assessment from the automated reviewer, wherein comparing comprises generating a measure of the correlation of the at least one assessment from the customer with the at least one assessment from the automated reviewer and using the measure of correlation to confirm or modify future assessments of the automated reviewer;
- storing, the at least one assessment, the communication session attribute, and an overall assessment of the select communication session into a single class in an object-oriented database such that the overall assessment and the at least one assessment are indistinguishable from the communication attribute when stored; and
- deriving a neural network using the single class.

11. The method of claim 10, wherein the measure of the correlation is applied to an e-learning tool.

12. The system of claim 10, wherein the communication session attribute is objective, the at least one assessment is subjective, and the overall assessment is subjective.

13. The method of claim 10, wherein presenting the subset to the automated reviewer comprises identifying recorded communication sessions for which customer feedback is available.

14. The method of claim 10, wherein the single class is used for deriving patterns, trends and correlations between the at least one assessment, the overall assessment, and the communication session attribute.

15. The method of claim 10, wherein the measure of correlation is used as an input applied to a reviewer-evaluation process.

16. The method of claim 10, wherein the at least one assessment from the customer is used as an input applied to an agent-evaluation process.

17. The method of claim 10, wherein the at least one assessment from the automated reviewer is used as an input applied to an agent-evaluation process.

18. The method of claim 10, further comprising presenting a communication session attribute with the at least one assessment from the automated reviewer and the at least one assessment from the customer.

19. The method of claim 18, wherein presenting the communication session attribute comprises presenting an indicator of the source of the communication session attribute.

20. The method of claim 18, wherein presenting the communication session attribute comprises presenting an identifier associated with an algorithm that generated the communication session attribute.

* * * * *